United States Patent
Hariharan et al.

(10) Patent No.: US 11,093,986 B2
(45) Date of Patent: Aug. 17, 2021

(54) PERSONALIZED DELIVERY TIME ESTIMATE SYSTEM

(71) Applicant: eBay Inc., San Jose, CA (US)

(72) Inventors: Gurushyam Hariharan, Santa Clara, CA (US); Faisal Masud, Sammamish, WA (US); Prakash Muppirala, San Jose, CA (US); Raj Desai, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 285 days.

(21) Appl. No.: 16/157,182

(22) Filed: Oct. 11, 2018

(65) Prior Publication Data

US 2019/0043102 A1 Feb. 7, 2019

Related U.S. Application Data

(63) Continuation of application No. 13/436,618, filed on Mar. 30, 2012, now Pat. No. 10,134,066.

(51) Int. Cl.
*G06Q 30/06* (2012.01)
*G06Q 10/08* (2012.01)

(52) U.S. Cl.
CPC .......... *G06Q 30/06* (2013.01); *G06Q 10/083* (2013.01); *G06Q 30/0601* (2013.01)

(58) Field of Classification Search
CPC ............................................... G06Q 30/06–08
USPC ................................................ 705/26.1–27.2
See application file for complete search history.

(56) References Cited

U.S. PATENT DOCUMENTS

| | | | |
|---|---|---|---|
| 5,946,662 A * | 8/1999 | Ettl | G06Q 10/06315 705/7.26 |
| 7,035,815 B1 * | 4/2006 | Henson | G06Q 10/087 705/26.5 |
| 7,778,878 B2 | 8/2010 | Harding et al. | |
| 7,996,328 B1 * | 8/2011 | Lundberg | G06Q 10/08 705/333 |
| 8,209,242 B1 * | 6/2012 | Henderson | G06Q 20/20 705/28 |
| 8,266,014 B1 | 9/2012 | Bhosle et al. | |
| 8,341,003 B1 | 12/2012 | Bilibin et al. | |
| 8,346,676 B1 * | 1/2013 | Bennett | G06Q 10/063 705/335 |
| 8,407,155 B2 | 3/2013 | Greco | |
| 8,429,019 B1 * | 4/2013 | Yeatts | G06Q 10/083 705/26.1 |
| 8,533,054 B1 | 9/2013 | Haney et al. | |
| 8,666,846 B1 | 3/2014 | Chenault et al. | |

(Continued)

OTHER PUBLICATIONS http://www.tdci.com/MAC-PAC/Documentation/MAC-PAC-Reference-Library/Distribution/Order-Processing/Key-Concepts-and-Procedures/Order-Release-and-Picker-Information/Shipping-Lead-Time-Calculations.*

(Continued)

*Primary Examiner* — Ming Shui
(74) *Attorney, Agent, or Firm* — Schwegman Lundberg & Woessner, P.A.

(57) ABSTRACT

A personalized delivery estimate system is described. A commercial transaction is generated between a seller and a buyer for an item in an online marketplace. Historical transactions of buyers and sellers in the online marketplace are stored in a storage device. A personalized delivery time estimate is computed for the buyer of the commercial transaction using seller information, buyer information, and item information with the historical transactions of buyers and sellers in the online marketplace.

18 Claims, 7 Drawing Sheets

(56) References Cited

U.S. PATENT DOCUMENTS

| | | | |
|---|---|---|---|
| 10,134,066 | B2 | 11/2018 | Hariharan et al. |
| 2003/0182222 | A1 | 9/2003 | Rotman et al. |
| 2004/0015408 | A1 | 1/2004 | Rauen, IV et al. |
| 2004/0139032 | A1 | 7/2004 | Rowan |
| 2004/0212833 | A1 | 10/2004 | Taskett et al. |
| 2005/0171856 | A1* | 8/2005 | Takahashi .......... G06Q 30/0641 705/330 |
| 2005/0197892 | A1 | 9/2005 | Bilibin et al. |
| 2007/0061185 | A1* | 3/2007 | Peters .................... G06Q 10/10 |
| 2008/0203147 | A1 | 8/2008 | Skaaksrud et al. |
| 2010/0250329 | A1 | 9/2010 | Sanli et al. |
| 2010/0312593 | A1* | 12/2010 | Johnston ................ G06Q 40/02 705/7.34 |
| 2011/0145107 | A1 | 6/2011 | Greco |
| 2012/0185404 | A1 | 7/2012 | Koh |
| 2012/0316990 | A1* | 12/2012 | Fallows ................. G06Q 30/02 705/26.35 |
| 2013/0144800 | A1 | 6/2013 | Fallows |
| 2013/0262274 | A1 | 10/2013 | Hariharan et al. |
| 2014/0172735 | A1 | 6/2014 | Jena et al. |

OTHER PUBLICATIONS

Schafer et al., "E-Commerce Recommendation Applications", Data Mining and Knowledge Discovery, vol. 5, No. 1-2, 2001, pp. 115-153.
Non-Final Office Action received for U.S. Appl. No. 13/720,768, dated Jan. 28, 2015, 19 pages.
Response to Non-Final Office Action filed on Mar. 13, 2015 for U.S. Appl. No. 13/720,768, dated Jan. 28, 2015, 18 pages.
Final Office Action received for U.S. Appl. No. 13/720,768, dated Jun. 18, 2015, 29 pages.
Response to Final Office Action filed on Oct. 19, 2015 for U.S. Appl. No. 13/720,768, dated Jun. 18, 2015, 11 pages.
Non-Final Office Action received for U.S. Appl. No. 13/720,768, dated Mar. 25, 2016, 26 pages.
Response to Non-Final Office Action filed on Jul. 25, 2016 for U.S. Appl. No. 13/720,768, dated Mar. 25, 2016, 17 pages.
Final Office Action received for U.S. Appl. No. 13/720,768, dated Oct. 28, 2016, 36 pages.
Response to Final Office Action filed on Apr. 28, 2017 for U.S. Appl. No. 13/720,768, dated Oct. 28, 2016, 24 pages.
Non-Final Office Action received for U.S. Appl. No. 13/720,768, dated Sep. 8, 2017, 38 pages.
Applicant Interview Summary received U.S. Appl. No. 13/720,768, dated Nov. 22, 2017, 3 pages.
Response to Non-Final Office Action filed on Jan. 3, 2018, for U.S. Appl. No. 13/720,768, dated Sep. 8, 2017, 19 pages.
Final Office Action received for U.S. Appl. No. 13/720,768, dated May 30, 2018, 31 pages.
U.S. Appl. No. 13/436,618, U.S. Pat. No. 10,134,066, filed Mar. 30, 2012, Personalized Delivery Time Estimate System.
U.S. Appl. No. 13/720,768, filed Dec. 19, 2012, Guaranteed Shipping Cost.
"U.S. Appl. No. 13/436,618, Non Final Office Action dated Apr. 8, 2014", 16 pgs.
"U.S. Appl. No. 13/436,618, Response filed Jul. 8, 2014 to Non Final Office Action dated Apr. 18, 2014", 12 pgs.
"U.S. Appl. No. 13/436,618, Non Final Office Action dated Oct. 15, 2014", 26 pgs.
"U.S. Appl. No. 13/436,618, Response filed Jan. 15, 2015 to Non Final Office Action dated Oct. 15, 2014", 19 pgs.
"U.S. Appl. No. 13/436,618, Final Office Action dated Jun. 4, 2015", 20 pgs.
"U.S. Appl. No. 13/436,618, Response filed Oct. 5, 2015 to Final Office Action dated Jun. 4, 2015", 14 pgs.
"U.S. Appl. No. 13/436,618, Non Final Office Action dated Mar. 24, 2016", 11 pgs.
"U.S. Appl. No. 13/436,618, Response filed Jul. 25, 2016 to Non Final Office Action dated Mar. 24, 2016", 22 pgs.
"U.S. Appl. No. 13/436,618, Final Office Action dated Nov. 3, 2016", 10 pgs.
"U.S. Appl. No. 13/436,618, Response filed May 1, 2017 to Final Office Action dated Nov. 3, 2017", 18 pgs.
"U.S. Appl. No. 13/436,618, Non Final Office Action dated Oct. 6, 2017", 13 pgs.
"U.S. Appl. No. 13/436,618, Examiner Interview Summary dated Feb. 14, 2018", 3 pgs.
"U.S. Appl. No. 13/436,618, Response filed Mar. 6, 2018 to Non Final Office Action dated Oct. 6, 2017", 26 pgs.
"U.S. Appl. No. 13/436,618, Notice of Allowance dated Jul. 5, 2018", 8 pgs.
"U.S. Appl. No. 13/436,618, Corrected Notice of Allowability dated Aug. 9, 2018", 5 pgs.

* cited by examiner

PERSONALIZED DELIVERY TIME ESTIMATE SYSTEM

CLAIM OF PRIORITY

This Application is a Continuation of U.S. application Ser. No. 13/436,618, filed Mar. 30, 2012, which is hereby incorporated by reference in its entirety.

TECHNICAL FIELD

This application relates generally to the field of computer technology and, in a specific example embodiment, to a system and method for a personalized delivery date estimate.

BACKGROUND

Websites provide a number of publishing, listing, and price-setting mechanisms whereby a publisher (e.g., a seller) may list or publish information concerning items for sale. Once a buyer places an order for an item, the seller fulfills the order by shipping the item to the buyer.

The buyer, eager to receive the item, is provided a time range estimate that typically spans from several days to a week. Such poor shipping delivery estimate accuracy can create frustration in the buyer from not knowing when exactly to expect receipt of the item. Such a poor experience can result in the buyer reducing purchases from the seller and reducing visits to the publisher.

BRIEF DESCRIPTION OF THE DRAWINGS

The present description is illustrated by way of example, and not by way of limitation, in the figures of the accompanying drawings in which.

DETAILED DESCRIPTION

Although the embodiments have been described with reference to specific example embodiments, it will be evident that various modifications and changes may be made to these embodiments without departing from the broader spirit and scope of the description. Accordingly, the specification and drawings are to be regarded in an illustrative rather than a restrictive sense.

In various embodiments, a personalized delivery estimate system is described. A commercial transaction is generated between a seller and a buyer for an item in an online marketplace. Historical transactions of buyers and sellers in the online marketplace are stored in a storage device. A personalized delivery time estimate is computed for the buyer of the commercial transaction using seller information, buyer information, and item information with the historical transactions of buyers and sellers in the online marketplace.

Figure 1:
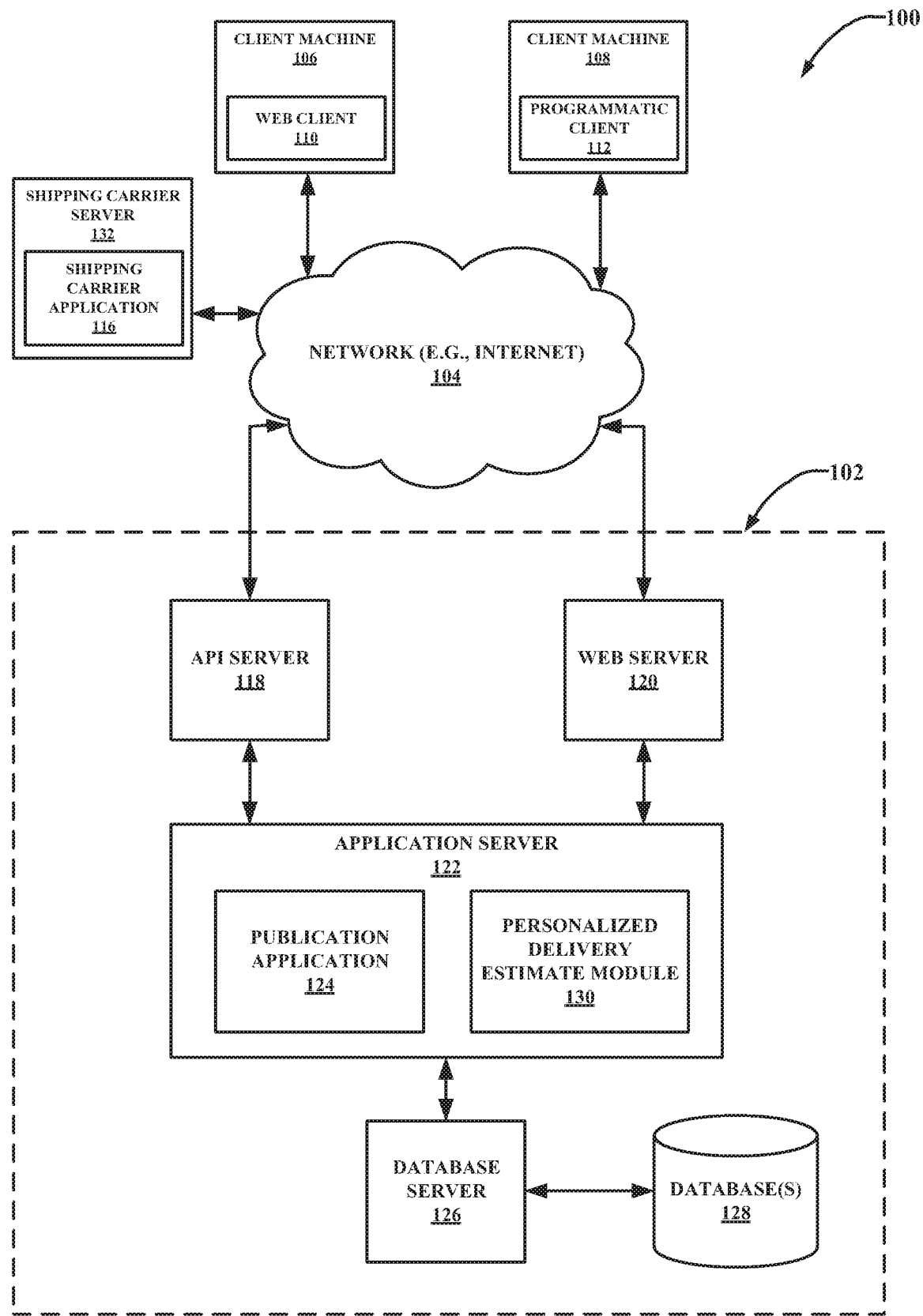
FIG. 1 is a network diagram depicting a network system, according to one embodiment, having a client-server architecture configured for exchanging data over a network.

FIG. 1 is a network diagram depicting a network system 100, according to one embodiment, having a client-server architecture configured for exchanging data over a network. For example, the network system 100 comprises a network-based publisher 102, where clients may communicate and exchange data within the network system 100. The data may pertain to various functions (e.g., online item purchases) and aspects (e.g., managing order information) associated with the network system 100 and its users. Although illustrated herein as a client-server architecture as an example, other embodiments may include other network architectures, such as a peer-to-peer or distributed network environment.

A data exchange platform, in an example form of the network-based publisher 102, may provide server-side functionality, via a network 104 (e.g., the Internet), to one or more clients. The one or more clients may include users that utilize the network system 100 and, more specifically, the publication/publisher system 102, to exchange data over the network 104. These transactions may include transmitting, receiving (communicating), and processing data to, from, and regarding content and users of the network system 100. The data may include, but are not limited to, content and user data such as order and shipping tracking information; item information; user profiles, user attributes; user reputation values; product and service reviews and information (such as pricing and descriptive information); product, service, manufacturer, and vendor recommendations and identifiers; product and service listings associated with buyers and sellers; auction bids; and transaction data, among other things.

In various embodiments, the data exchanges within the network system 100 may be dependent upon user-selected functions available through one or more client or user interfaces (UIs). The UIs may be associated with a client machine, such as a client machine 106 using a web client (e.g., web browser) 110. The web client 110 may be in communication with the network-based publisher 102 via a web server 120. The UIs may also be associated with a client machine 108 using a programmatic client 112, such as a client application. It can be appreciated that in various embodiments, the client machines 106 and 108 may be associated with a buyer, a seller, a third party electronic commerce platform, and/or a payment service provider. The buyers and sellers may be any one of individuals, merchants, or service providers, among other things.

Furthermore, a shipping carrier server 132 of a shipping service provider may be in communication with the network-based publisher 102 and optionally with client machines 106 and 108. The shipping carrier server 132 includes a shipping carrier application 116 to provide a shipping tracking mechanism to the client machines 106 and 108 and an application server 122 of the network-based publisher 102. The shipping tracking mechanism allows the client machines 106 and 108 and the application server 122 to determine a status of a shipment for an item associated with an order placed by a buyer of the network-based publisher 102.

Turning specifically to the network-based publisher 102, an application program interface (API) server 118 and a web server 120 are coupled to, and provide programmatic and web interfaces respectively to, one or more application servers 122. The application servers 122 host a publication application 124 and a personalized delivery estimate module 130. The application servers 122 are, in turn, shown to be coupled to one or more database server(s) 126 that facilitate access to one or more database(s) 128.

In one embodiment, the web server 120 and the API server 118 communicate about and receive data pertaining to listings, transactions, order tracking information, and feedback, among other things, via various user input tools. For example, the web server 120 may send and receive data to and from a toolbar or webpage on a browser application (e.g., web client 110) operating on a client machine (e.g., client machine 106). The API server 118 may send and receive data to and from an application (e.g., web client 110 or shipping carrier application 116) running on another client machine (e.g., shipping carrier server 132).

The publication application 124 may provide a number of publisher functions and services (e.g., listing, payment, etc.) to users that access the network-based publisher 102. For example, the publication application 124 may provide a number of services and functions to users for listing goods and/or services for sale, facilitating transactions, and reviewing and providing feedback about transactions and associated users. The publication application 124 may further report a shipment status related to a transaction. In one embodiment, the publication application 124 includes an online marketplace. The online marketplace may generate a commercial transaction between a seller and a buyer for an item listed in the online marketplace.

The personalized delivery estimate module 130 generates a personalized delivery time estimate to a buyer of the online marketplace for an item sold by a seller. The personalized delivery time estimate may include a date and time estimate, a range of dates, and a range of dates and times. The personalized delivery estimate module 130 may generate a personalized delivery time estimate for the buyer of the commercial transaction using seller information, buyer information, and item information with the historical transactions of buyers and sellers in the online marketplace. An embodiment of the personalized delivery estimate module 130 is further described below.

Figure 2:
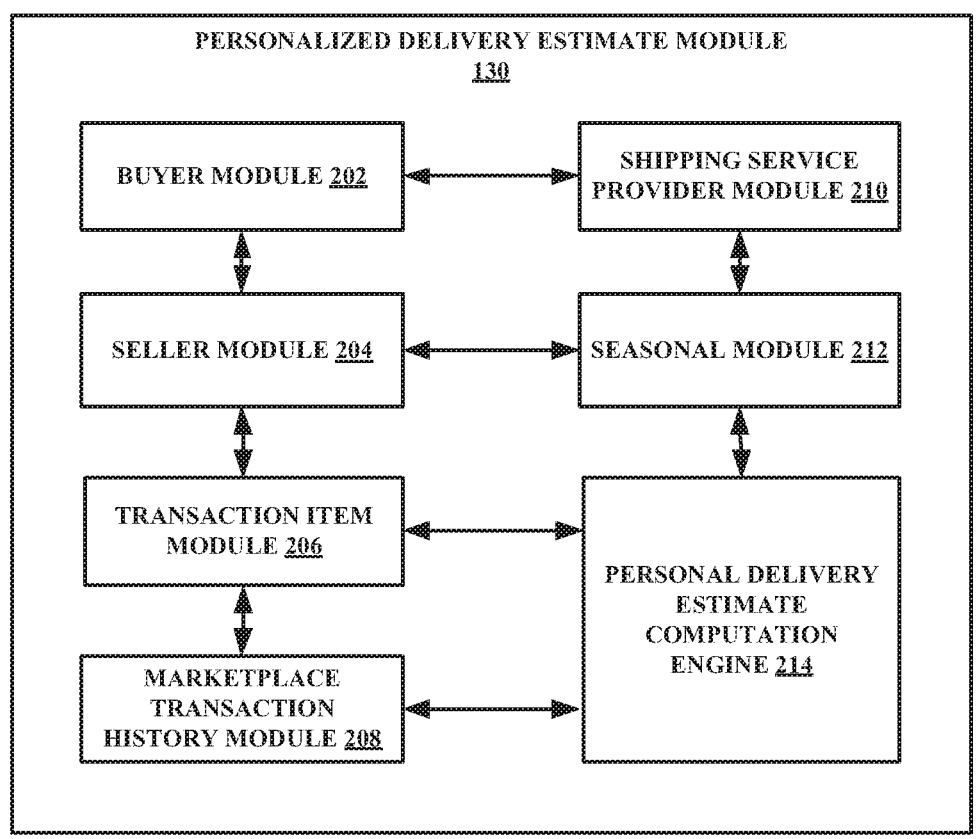
FIG. 2 is a block diagram illustrating an example embodiment of a personalized delivery estimate application.

FIG. 2 is a block diagram illustrating an example embodiment of the personalized delivery estimate module 130. In one embodiment, the personalized delivery estimate module 130 includes a buyer module 202, a seller module 204, a transaction item module 206, a marketplace transaction history module 208, a shipping service provider module 210, a seasonal module 212, and a personal delivery estimate computation engine 214.

The buyer module 202 determines a shipping delivery geographic location using the buyer information from the publication application 124. For example, the buyer information may include a name, a physical address (i.e., street name/post office box and zip code), an email address, and a telephone number. In particular, the buyer information may also include a mailing address. For example, the buyer may wish to have the item ordered on the online marketplace shipped to a particular delivery address or location. The buyer information may be stored in a storage device, such as the database 128.

The seller module 204 determines a shipping origin geographic location using the seller information from the publication application 124. For example, the seller information may include a name, a physical address (i.e., street name/post office box and zip code), an email address, and a telephone number. In particular, the seller information may also include an origin address. For example, the seller may ship the item from a warehouse or a location other than the seller address registered on the online marketplace. The seller information may be stored in a storage device, such as the database 128.

The transaction item module 206 identifies the item to be shipped and specifications of a shipping package based on the identified item. For example, the transaction item module 206 may identify an item with its name, weight, physical dimensions, and model number. The specifications of the shipping package may include a weigh of the shipping package and physical dimensions of the shipping package to fit the item. The specification of the shipping package may be determined or extrapolated from the identification of the item. For example, if the item to be shipped is a printer, the dimensions and weight of the printer may be obtained from the model number. The dimensions of the shipping container may then be obtained from the dimensions and weight of the printer.

In another embodiment, the seller may be prompted to provide the transaction item module 206 with the specifications of the shipping package.

In yet another embodiment, the physical specifications of the item may include, for example, physical dimensions (e.g., height, width, length, and weight). Physical dimensions may be deduced or derived, for example, from a picture or video of the item taken with a mobile device of the seller.

The marketplace transaction history module 208 identifies historical delivery times (e.g., elapsed time from order placed to item received) using the historical transactions of buyers and sellers in the online marketplace of the item and the historical transactions of the seller in the online marketplace. The historical transactions of buyers and sellers in the online marketplace may be stored in a storage device, such as database 128.

The historical transactions of buyers and sellers may include buyer information, seller information, origin address, shipping address, items shipped, shipping service provider, shipping and handling elapsed time (e.g., how long did it take from the time the buyer placed the order to the time the item was delivered to the buyer), handling time (e.g., how long it took the seller to deposit the item with the shipping carrier), shipping duration (e.g., how long was the time in transit with the shipping carrier), and data and time of delivery.

In another embodiment, the marketplace transaction history module 208 identifies historical transactions of buyers having a shipping origin within a first threshold distance of the shipping origin of the buyer, and sellers having a shipping destination within a second threshold distance of the shipping destination of the seller, for items having specifications similar to a specification of the item. In other words, the marketplace transaction history module 208 identifies previous transactions involving similar items that were shipped from a similar geographic source location to a similar geographic destination location. The marketplace transaction history module 208 then computes an average shipping and handling time using the identified historical transactions. To refine the estimate, the marketplace transaction history module 208 may further identify similar shipping carriers with similar selected shipping services.

In another embodiment, the marketplace transaction history module 208 computes an average handling time for the seller to ship the item using the historical delivery times. The handling time comprises a time elapsed from when an order is received by the seller from the online marketplace to when the item is shipped by the seller.

In yet another embodiment, the historical transactions of the seller include seller ratings, seller feedbacks, and a number of items shipped on the online marketplace from the seller.

The shipping service provider module 210 determines a shipping carrier delivery estimate using the seller information, the buyer information, specifications of the shipping package, and a selected shipping service. For example, given the origin address, the destination address, and the selected shipping service (e.g., first class, expedited delivery, rush, priority, next day, ground, express, and so forth), the shipping service provider module 210 communicates with the corresponding shipping service provider to obtain a delivery estimate based on the above input. For example, the shipping service provider may determine that it takes 5-7 days to ship the item from a first location to a second location. It should be noted that the shipping carrier delivery estimate does not include the handling time: the elapsed time between the time an order is received by the seller and the time the item is provided to (or picked up by) the shipping service provider for shipping by the seller. In another embodiment, the handling time may include the elapsed time between the time an order is received and the time the shipping service provider is notified to pick up the item.

The seasonal module 212 determines a shipping season and any other external factors affecting a shipping duration of the item. For example, weather and holidays may affect shipping time. Other factors may include employees' strikes, power outages, fuel shortages, and so forth.

The personal delivery estimate computation engine 214 generates the personalized delivery time estimate for the buyer using the shipping delivery geographic location, the shipping origin geographic location, historical delivery times, the shipping carrier delivery estimate, the shipping season, and external factors. The personalized delivery time estimate comprises a range of dates.

For example, the personal delivery estimate computation engine 214 may determine how long it typically takes for a similar item to be shipped from a seller to a buyer with similar zip code, similar shipping carrier, and similar shipping carrier service.

In another example, the personal delivery estimate computation engine 214 may look at prior transactions from the seller to determine on average how long it typically takes for the seller to prepare an item for shipping. For example, it may take, on average, 1.5 days for a seller to ship the item from the time the order has been received.

In another embodiment, a further analysis may be performed based on the type of item being shipped. For example, some items may take a longer time to prepare for shipping (such as fragile items since they require more packaging and preparation).

In another embodiment, different weights may be assigned to the shipping delivery geographic location, the shipping origin geographic location, historical delivery estimates, the shipping carrier delivery estimate, the shipping season, and external factors to compute the personalized delivery time estimate for the buyer.

For example, the historical delivery estimates may carry a heavier weight in computing the personalized delivery time estimate for the buyer than the shipping carrier delivery estimate.

Figure 3:
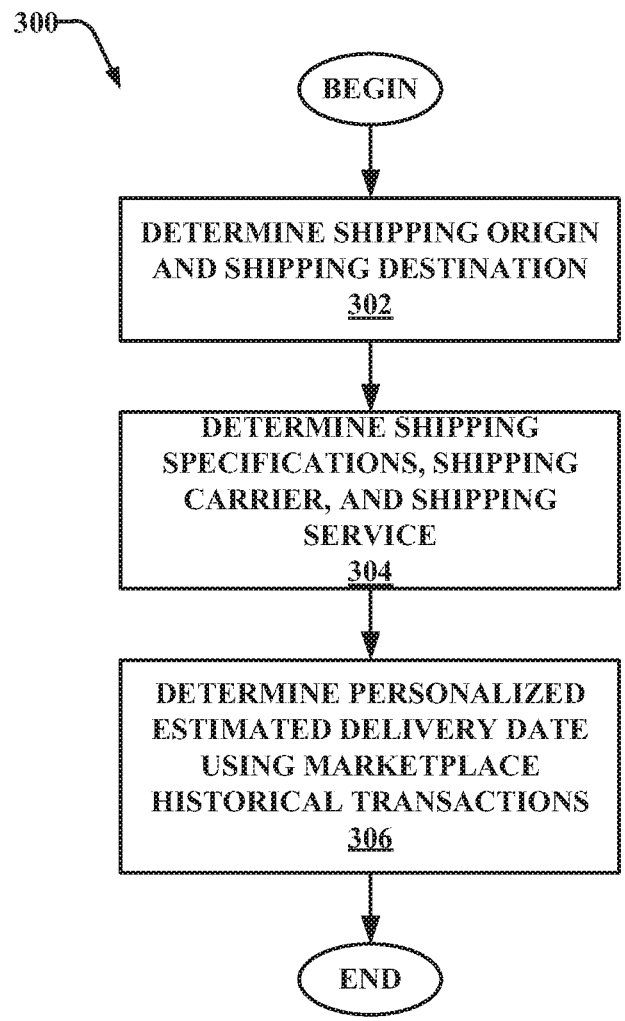
FIG. 3 is a flow diagram illustrating an example embodiment of a process for a personalized delivery estimate application.

FIG. 3 is a flow diagram 300 illustrating an example embodiment of a process for a personalized delivery estimate application. At operation 302, a shipping origin and destination are determined. For example, the shipping origin and destination may be determined from the commercial transaction between a seller and a buyer in an online marketplace. The seller may ship the item from a particular geographic origin location. The buyer may wish to receive delivery of the item at a particular geographic destination location. In one embodiment, the operation 302 may be implemented using the buyer module 202 and the seller module 204.

At operation 304, the shipping specifications, shipping carrier, and shipping service are determined. In one embodiment, the information from the commercial transaction in the online marketplace may be used to determine the weight and dimension of a shipping container for the ordered item. The shipping carrier and the shipping service (e.g., express or regular) may also be determined from the commercial transaction. In one embodiment, the operation 304 may be implemented using the transaction item module 206.

At operation 306, a personalized delivery date and time estimate may be computed using the previous information (from the buyer module 202, the seller module 204, and the transaction item module 206) by comparing and mining data from the marketplace transaction history module 208. In other words, personalized delivery estimates may be generated by looking at similar transactions (e.g., same origin zip code, same destination zip code, same shipping carrier, and same shipping service) from the prior history of transactions to better determine and estimate a delivery date.

Figure 4:
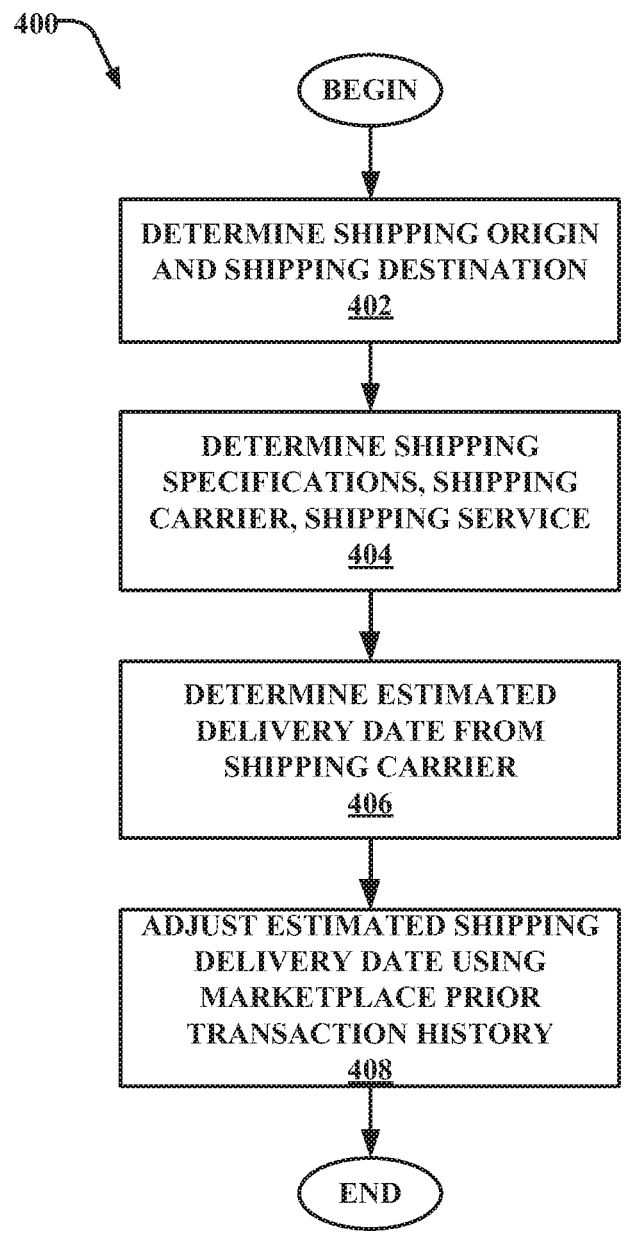
FIG. 4 is a flow diagram illustrating another example embodiment of a process for a personalized delivery estimate application.

FIG. 4 is a flow diagram 400 illustrating another example embodiment of a process for a personalized delivery estimate application. At operation 402, shipping origin and destination are determined. For example, the shipping origin and destination may be determined from the commercial transaction between a seller and a buyer in an online marketplace. The seller may ship the item from a particular geographic origin location. The buyer may wish to receive delivery of the item at a particular geographic destination location. In one embodiment, the operation 402 may be implemented using the buyer module 202 and the seller module 204.

At operation 404, the shipping specifications, shipping carrier, and shipping service are determined. In one embodiment, the information from the commercial transaction in the online marketplace may be used to determine the weight and dimension of a shipping container for the ordered item. The shipping carrier and the shipping service (e.g., express or regular) may also be determined from the commercial transaction. In one embodiment, the operation 404 may be implemented using the transaction item module 206.

At operation 406, the shipping carrier generates a first estimated shipping delivery date based on the provided information. It should be noted that that shipping carrier may use their own database and shipping estimate algorithm to generate their own estimates. The present disclosure seeks to further refine the estimated shipping delivery date by mining the data from the historical transactions on the online marketplace. For example, instead of a delivery estimate of 2-5 days, the personal delivery estimate computation engine 214 may provide a narrower and more precise delivery estimate (e.g., 3-4 days).

At operation 408, the personal delivery estimate computation engine 214 generates a second estimated shipping delivery date based on the data from the historical transactions on the online marketplace. In one embodiment, the first estimated shipping delivery date is adjusted using the second estimated delivery date. In another embodiment, an average estimated shipping delivery date may be generated based on a median, or average, of the first estimated delivery date and the second estimated delivery date.

Figure 5:
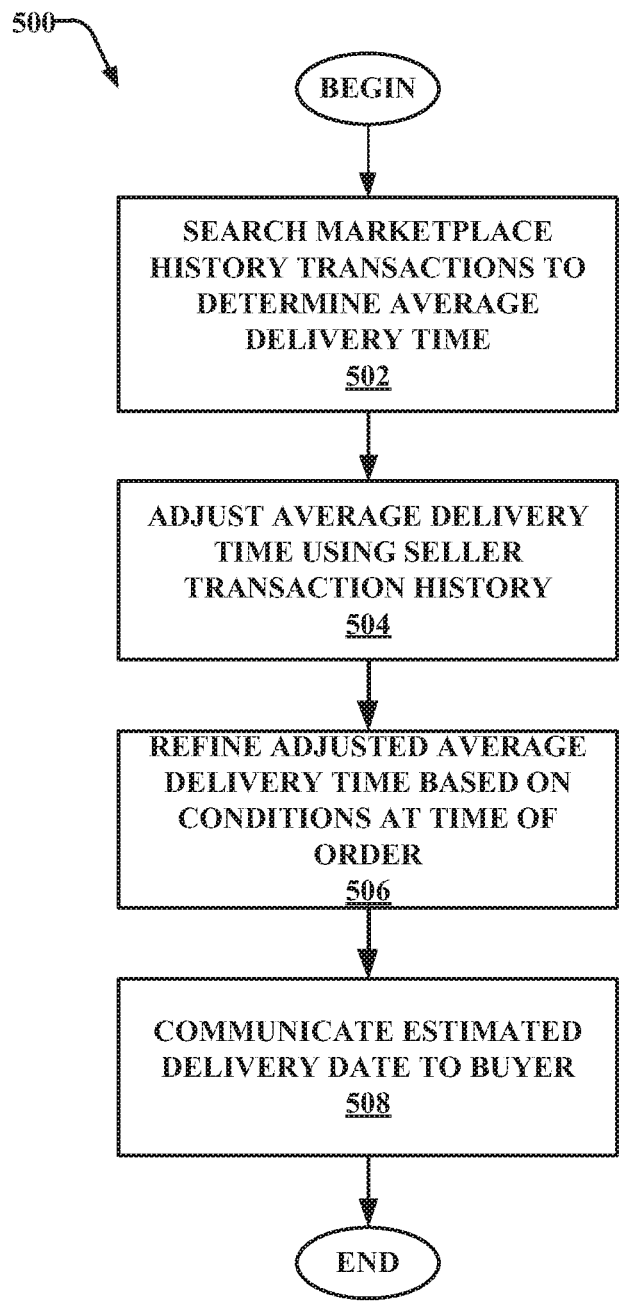
FIG. 5 is a flow diagram illustrating an example embodiment of a method for computing a delivery date estimate.

FIG. 5 is a flow diagram 500 illustrating an example embodiment of a method for computing a delivery date estimate. At operation 502, the personal delivery estimate computation engine 214 searches the marketplace transaction history module 208 to retrieve an average delivery time (e.g., 3.5 days) from shipping origin to a shipping destination with a same zip code, a same shipping carrier, a same shipping service, and a same item. In another embodiment, zip codes within a threshold radius of the zip code from the shipping destination of the item from the commercial transaction may be used. Items similar in size and weight may also be identified.

At operation 504, the average delivery time is adjusted using transaction history from the same seller with the personalized delivery estimate computation engine 214. For example, the transaction history may include seller feedback, number of items shipped, handling time, and so forth. Each of these factors are weighted to adjust (increase or decrease) the average delivery time. For example, the average delivery time may decrease when the item is sold by a seller with mostly positive feedback. The average delivery time may decrease based on the average handling time it takes the seller to package and ship items.

Alternative embodiments include retrieving the average delivery time by category/size/weight/dimensions/values of items corresponding to the actual item to be shipped. For example, the seller transactions history may indicate that the average handling time for high value items (value of items exceeding a threshold) may be 1.2 days whereas the average handling time for low value items (value of items below a threshold) may be 1.8 days. Based on those observations, the average delivery time may be tuned and refined.

At operation 506, the adjusted average delivery time computed in operation 504 is further adjusted based on conditions present surrounding the time of shipping with the personalized delivery estimate computation engine 214. For example, there may be a snow storm including zip codes neighboring the zip code of the destination shipping address. Such a snow storm may create a delay. As such, the adjusted average delivery time from operation 504 may be further adjusted to reflect the snow storm conditions. Other conditions may include labor strikes, road conditions, fuel shortages, or any other disrupting current conditions at the time of shipping that may affect the shipping delivery time.

At operation 508, the re-adjusted average estimated delivery date may be communicated to the buyer once the order has been placed. In another embodiment, to further improve accuracy of the estimated delivery date, the estimated delivery date is computed upon the seller acknowledging receipt of the order. In a further embodiment, to further improve accuracy of the estimated delivery date, the estimated delivery date is computed after the seller submits the shipping package containing the item to the shipping carrier.

Figure 6:
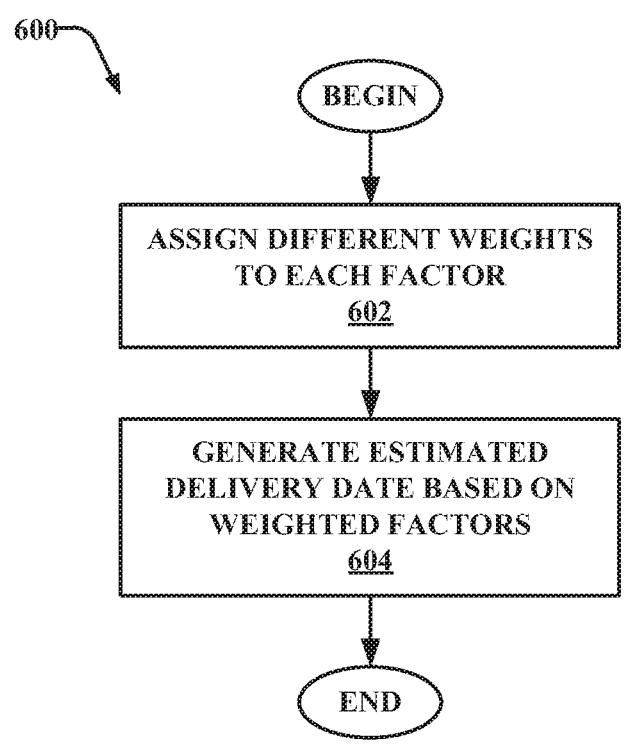
FIG. 6 is a flow diagram illustrating another example embodiment of a method for computing a delivery date estimate.

FIG. 6 is a flow diagram 600 illustrating another example embodiment of a method for computing a delivery date estimate. At operation 602, the personal delivery estimate computation engine 214 assigns different weights to each different factor (e.g., seller feedback, total number of items shipped on the online marketplace (and/or other marketplaces), handling time elapsed on the online marketplace (and/or other marketplaces), shipping season (Christmas time, Valentine's Day, and so forth), and shipping carrier performance.

In another embodiment, the personal delivery estimate computation engine 214 may recommend that the seller utilize the shipping services of another carrier based on the shipping carrier performance computed by mining the database of the online marketplace for historical transactions.

At operation 604, the personalized delivery estimate computation engine 214 computes an estimated delivery based on the weighted factors.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Figure 7:
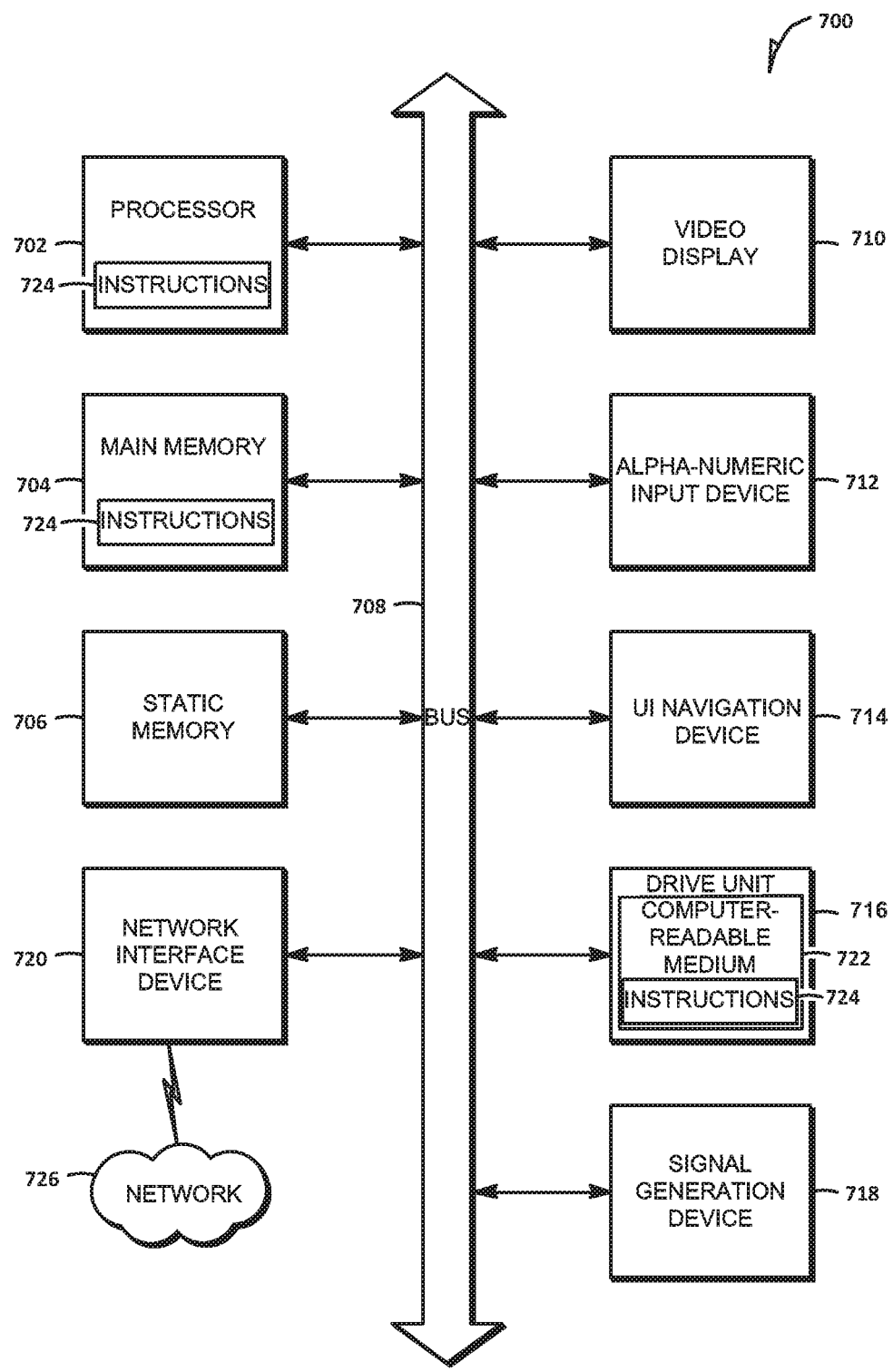
FIG. 7 shows a diagrammatic representation of a machine in the example form of a computer system within which a set of instructions may be executed to cause the machine to perform any one or more of the methodologies discussed herein.

FIG. 7 shows a diagrammatic representation of a machine in the example form of a computer system 700 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a UI navigation device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, with the main memory 704 and the processor 702 also constituting machine-readable media.

The software 724 may further be transmitted or received over a network 726 via the network interface device 720 utilizing any one of a number of well-known transfer protocols (e.g., HTTP).

While the machine-readable medium 722 is shown in an example embodiment to be a single medium, the term "machine-readable medium" should be taken to include a single medium or multiple media (e.g., a centralized or distributed database, and/or associated caches and servers) that stores the one or more sets of instructions. The term "machine-readable medium" shall also be taken to include any medium that is capable of storing, encoding or carrying a set of instructions for execution by the machine and that cause the machine to perform any one or more of the methodologies of the present description or that is capable of storing, encoding or carrying data structures utilized by or associated with such a set of instructions. The term "machine-readable medium" shall accordingly be taken to include, but not be limited to, solid-state memories, optical media, and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

What is claimed is:

1. A system, comprising:
   a processor and executable instructions accessible on a computer-readable medium that, when executed, cause the processor to perform operations comprising:
   generating a commercial transaction between a seller and a buyer for an item in an online marketplace;
   identifying a shipping attribute from the commercial transaction;
   retrieving a first estimated delivery date from a shipping carrier server based on the shipping attribute;
   identifying a historical transaction having a historical shipping attribute matching the shipping attribute of the commercial transaction;
   determining a second estimated delivery date based on historical delivery times associated with the historical transaction;
   adjusting the second estimated delivery date based on transaction history of the seller;
   generating a personalized delivery time estimate for the buyer for the item of the commercial transaction based on the first estimated delivery date and the second estimated delivery date;
   calculating an item-specific average handling time for the seller based on shipped items with a similar weight and similar physical dimensions to the item;
   calculating an item-specific average shipping time of the shipped items similar to a shipping weight and shipping dimensions of the item between a shipping origin geographic location and a shipping delivery geographic location with a similar shipping carrier and a similar shipping service of the similar shipping carrier based on the historical transaction;
   adjusting the personalized delivery time estimate for the buyer of the commercial transaction based on the item-specific average handling time for the seller and the item-specific average shipping time; and
   causing display of the personalized delivery time estimate on a user interface of a client machine associated with the buyer.

2. The system of claim 1, wherein the shipping attribute includes one or more of a shipping origin geographic location, a shipping delivery geographic location, a shipping weight and shipping dimensions of the item, a shipping carrier, or a shipping service of the shipping carrier.

3. The system of claim 1, wherein the item-specific; average handling time comprises an average time elapsed from when an order is received by the seller from the online marketplace to when the item is shipped by the seller.

4. The system of claim 1, wherein the transaction history of the seller includes seller ratings, seller feedbacks, and a number of items shipped on the online marketplace from the seller.

5. The system of claim 2, wherein the operations further comprise:
   determining the shipping delivery geographic location using buyer information;
   determining the shipping origin geographic location using seller information; and identifying the item and specifications of a shipping package based on the identified item, the specifications of the shipping package comprising a weight of the shipping package and physical dimensions of the shipping package.

6. The system of claim 5, wherein the operations further comprise:
determining a shipping carrier delivery estimate using the seller information, the buyer information, the specifications of the shipping package, and the shipping service of the shipping carrier.

7. The system of claim 6, wherein the operations further comprise:
determining a shipping season and external factors affecting a shipping time of the item.

8. The system of claim 7, wherein the personalized delivery time estimate is determined based on the shipping season and the external factors, the personalized delivery time estimate comprising a range of dates.

9. The system of claim 1, wherein different weights are assigned to the first estimated delivery date and the adjusted second estimated delivery date when computing the personalized delivery time estimate.

10. A method comprising:
generating a commercial transaction between a seller and a buyer for an item in an online marketplace;
identifying a shipping attribute from the commercial transaction;
retrieving a first estimated delivery date from a shipping carrier server based on the shipping attribute;
identifying a historical transaction having a historical shipping attribute matching the shipping attribute of the commercial transaction;
determining a second estimated delivery date based on historical delivery times associated with the historical transaction;
adjusting the second estimated delivery date based on transaction history of the seller;
generating a personalized delivery time estimate for the buyer for the item of the commercial transaction based on the first estimated delivery date and the second estimated delivery date;
calculating an item-specific average handling time for the seller based on shipped items with a similar weight and similar physical dimensions to the item;
calculating an item-specific average shipping time of the shipped items similar to a shipping weight and shipping dimensions of the item between a shipping origin geographic location and a shipping delivery geographic location with a similar shipping carrier and a similar shipping service of the similar shipping carrier based on the historical transaction;
adjusting the personalized delivery time estimate for the buyer of the commercial transaction based on the item-specific average handling time for the seller and the item-specific average shipping time; and
causing display of the personalized delivery time estimate on a user interface of a client machine associated with the buyer.

11. The method of claim 10, wherein the shipping attribute includes one or more of a shipping origin geographic location, a shipping delivery geographic location, a shipping weight and shipping dimensions of the item, a shipping carrier, or a shipping service of the shipping carrier.

12. The method of claim 10, wherein the item-specific average handling time comprises an average time elapsed from when an order is received by the seller from the online marketplace to when the item is shipped by the seller.

13. The method of claim 10, wherein the transaction history of the seller includes seller ratings, seller feedbacks, and a number of items shipped on the online marketplace from the seller.

14. The method of claim 11, further comprising:
determining the shipping delivery geographic location using buyer information;
determining the shipping origin geographic location using seller information; and
identifying the item and specifications of a shipping package based on the identified item, the specifications of the shipping package comprising a weight of the shipping package and physical dimensions of the shipping package.

15. The method of claim 14, further comprising:
determining a shipping carrier delivery estimate using the seller information, the buyer information, the specifications of the shipping package, and the shipping service of the shipping carrier.

16. The method of claim 15, further comprising:
determining a shipping season and external factors affecting a shipping time of the item, and wherein the personalized delivery time estimate is determined based on the shipping season and the external factors, the personalized delivery time estimate comprising a range of dates.

17. The method of claim 16, wherein different weights are assigned to the first estimated delivery date and the adjusted second estimated delivery date when computing the personalized delivery time estimate.

18. A non-transitory computer-readable storage medium storing a set of instructions that, when executed by a hardware processor, cause the hardware processor to perform operations comprising:
generating a commercial transaction between a seller and a buyer for an item in an online marketplace;
identifying a shipping attribute from the commercial transaction;
retrieving a first estimated delivery date from a shipping carrier server based on the shipping attribute;
identifying a historical transaction having a historical shipping attribute matching the shipping attribute of the commercial transaction;
determining a second estimated delivery date based on historical delivery times associated with the historical transaction;
adjusting the second estimated delivery date based on transaction history of the seller;
generating a personalized delivery time estimate for the buyer for the item of the commercial transaction based on the first estimated delivery date and the second estimated delivery date;
calculating an item-specific average handling time for the seller based on shipped items with a similar weight and similar physical dimensions to the item;
calculating an item-specific average shipping time of the shipped items similar to a shipping weight and shipping dimensions of the item between a shipping origin geographic location and a shipping delivery geographic location with a similar shipping carrier and a similar shipping service of the similar shipping carrier based on the historical transaction;
adjusting the personalized delivery time estimate for the buyer of the commercial transaction based on the item:

specific average handling time for the seller and the item-specific average shipping time; and causing display of the personalized delivery time estimate on a user interface of a client machine associated with the buyer.

* * * * *